United States Patent [19]

Lee

[11] Patent Number: 5,627,828
[45] Date of Patent: May 6, 1997

[54] METHOD AND CIRCUIT FOR DETECTING DATA COLLISIONS IN COMMUNICATION NETWORK

[75] Inventor: Wonro Lee, Seoul, Rep. of Korea

[73] Assignee: LG Semicon Co., Ltd., Cheongju, Rep. of Korea

[21] Appl. No.: 403,351

[22] Filed: Mar. 14, 1995

[30] Foreign Application Priority Data

Mar. 15, 1994 [KR] Rep. of Korea .................. 94-5120

[51] Int. Cl.$^6$ .................................................. H04J 3/02
[52] U.S. Cl. .................. 370/445; 370/517; 375/361
[58] Field of Search .................. 370/85.1–85.3, 370/100.1, 105.3, 108; 340/825.5; 371/48, 55, 61, 62; 375/282, 333, 359, 360, 361

[56] References Cited

U.S. PATENT DOCUMENTS

| | | | |
|---|---|---|---|
| 4,380,761 | 4/1983 | Boggs | 340/825.5 |
| 4,560,984 | 12/1985 | Scholl | 340/825.5 |
| 4,562,582 | 12/1985 | Tokura et al. | 375/282 |
| 4,573,045 | 2/1986 | Galin | 340/825.5 |
| 4,751,701 | 6/1988 | Roos et al. | 370/85 |
| 4,885,743 | 12/1989 | Helbers et al. | 370/85.2 |
| 4,975,929 | 12/1990 | Apple et al. | 370/105.3 X |
| 5,012,467 | 4/1991 | Crane | 370/85.3 |
| 5,162,791 | 11/1992 | Heegard | 340/825.5 |
| 5,267,237 | 11/1993 | Townley | 370/85.2 |

*Primary Examiner*—Benedict V. Safourek
*Assistant Examiner*—Ricky Ngo
*Attorney, Agent, or Firm*—Alan R. Loudermilk

[57] ABSTRACT

The circuit and method for detecting data collisions in a communication network, the circuit including: a data transition detecting section for receiving Manchester encoded data signals RXD, and detecting a transition at the center of the bit cell of the encoded data signals, and outputting a transition detecting signal Z having a certain pulse width; a delayer for delaying received clock signals RXC having a certain cycle synchronized with the received data signals RXD, and outputting delayed clock signals DRXC; and a data collision detecting section turning to an active mode in accordance with a data receiving status signal CRS illustrating the receiving status of the received data signals, and shifting the status of output signals in accordance with the transition detecting signal Z upon clocking of the delayed clock signal DRXC.

30 Claims, 3 Drawing Sheets

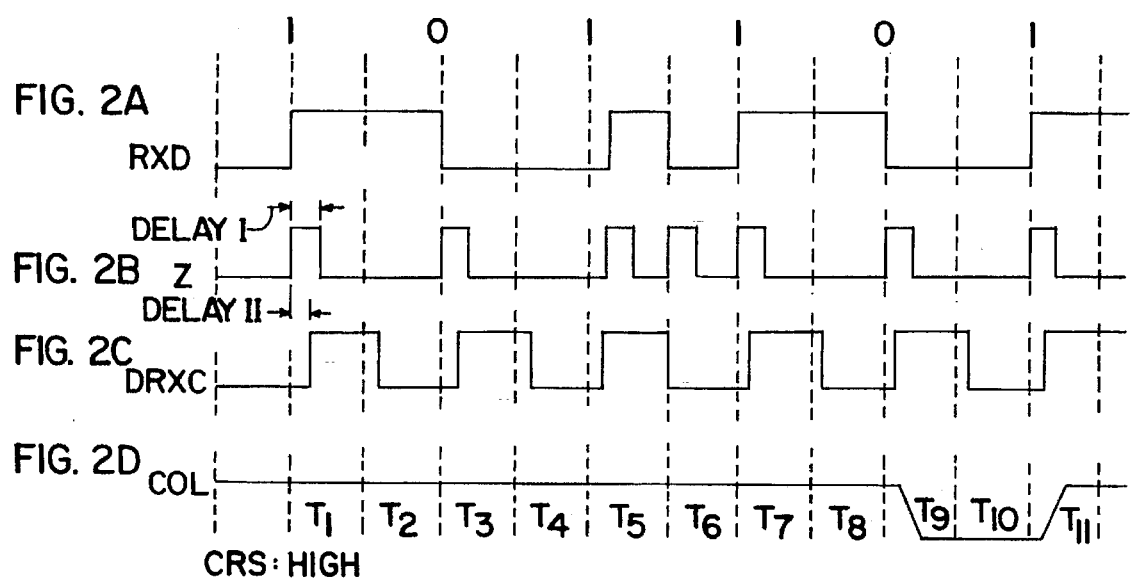
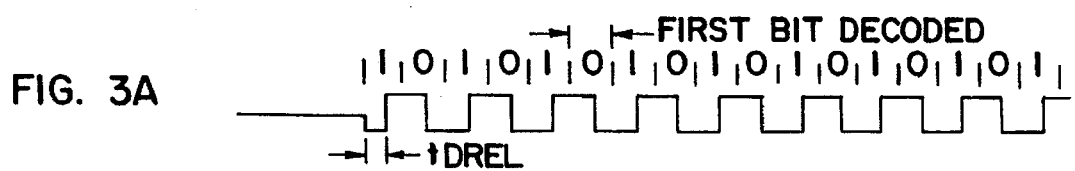
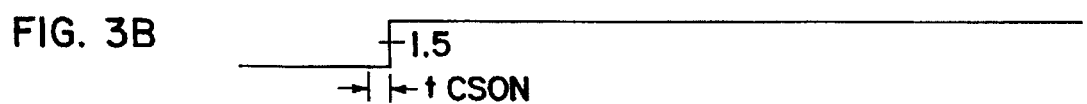
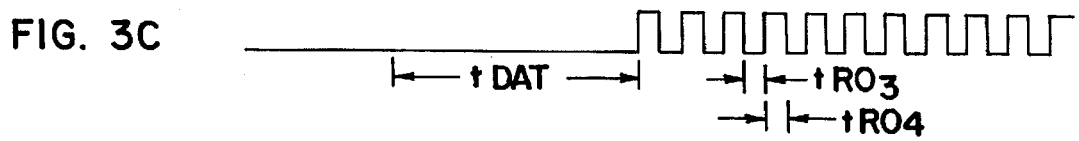

FIG. 4A  RXD 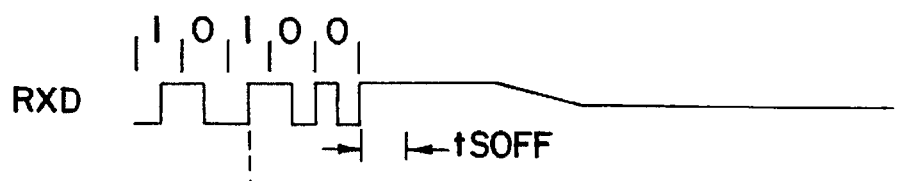
FIG. 4B  CRS 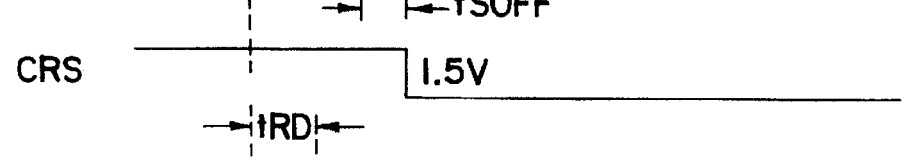
FIG. 4C  RXC 

METHOD AND CIRCUIT FOR DETECTING DATA COLLISIONS IN COMMUNICATION NETWORK

FIELD OF THE INVENTION

The present invention relates to circuits for detecting data collisions in a communication network, and a method therefor.

BACKGROUND OF THE INVENTION

In a communication network which is operated with a plurality of terminal units connected to a host computer and to each other, data sometimes collide with each other in the communication line, thereby causing illegible errors.

In order to detect data collisions in a communication system, there is a method of detecting the edges of received pulses for the detection of data collisions; a method of detecting the height of the threshold amplitude of transmitted signals for detection of data collisions; a method of checking the transmission and receiving CRC (cyclic redundancy check) codes for detecting data collisions; and a method of detecting the violation of the code rule of the Manchester code for detecting data collisions.

Among these methods for detecting data collisions, the most widely used one at present is the technique in which the violation of the code rule of the Manchester code is detected, which is used for detecting data collisions, and this technique is disclosed in U.S. Pat. No. 5,012,467.

In this method, a checking is made as to whether a transition occurs within a pre-set time window, and whether a next transition occurs in the same time window. If no transition occurs, there is output a signal which notifies an occurrence of a collision between signals.

That is, transitions at the center of a bit cell of the Manchester code is detected so as to output a trigger signal. This trigger signal is supplied to a pulse generator which has a certain pulse width and which is capable of re-triggering, thereby setting a time window. If the trigger signal does not appear within the time window, then a data collision detection signal is output.

However, in such conventional methods and circuits in which a violation of the code rule of the Manchester code is detected for detecting data collisions, an edge trigger detecting circuit is not used. Therefore, a relatively long delay (88–1100 μ seconds) is required for setting the time window. For this reason, an RC analog circuit is additionally required, with the result that the integration density and reliability worsen, and the manufacturing cost is increased.

SUMMARY OF THE INVENTION

The present invention is intended to overcome the above described disadvantages of the conventional techniques.

Therefore, it is an object of the present invention to provide a method for detecting data collisions in a communication network, and a circuit therefor, in which, in detecting data collisions during a communication, a pulse having a certain width is generated upon occurrence of a transition at the center of a data bit cell, and this pulse is compared with a variation of clock signals having a certain frequency synchronized with data signals.

In achieving the above and other objects, the circuit for detecting data collisions in a communication network according to the present invention includes data transition detecting section 1 for receiving data signals RXD encoded based on the Manchester code, to detect a transition at the center of the bit cell of the encoded data signals, and to output transition detecting signal Z having a certain pulse width; delayer 2 for delaying received clock signals RXC having a certain cycle synchronized with received data signals RXD, to output delayed clock signals DRXC; and data collision detecting section 3, which enters an active mode in accordance with data receiving status signal CRS illustrating the receiving status of the received data signals, and shifts the status of output signals in accordance with transition detecting signal Z upon clocking of delayed clock signal DRXC.

Data transition detecting section 1 includes: a delaying means for delaying the received data for a certain period of time; and a logic circuit for processing logically the delayed signals and undelayed signals.

Data collision detecting section 3 includes one or more D flip-flops for receiving transition detecting signals Z of the data transition detecting section into data input terminal D, and for receiving delayed clock signals DRXC of the delayer into clock input terminal CK to output an output having the same status as the data input status at a rising edge of the clock signal, and to output a data collision signal through output terminal Q.

In another aspect of the present invention, the method for detecting data collisions of received data RXD encoded based on the Manchester code according to the present invention includes the steps of: receiving data signals RXD encoded based on the Manchester code, and detecting a transition at a center of a bit cell of the encoded data to form transition detecting signal Z, which is a pulse signal existing for a certain period of time from the transition; delaying received clock signals RXC having a certain cycle in synchronization with received data signals RXD, to form delayed clock signal DRXC; and recognizing a data collision upon finding that a rising edge of delayed clock signal DRXC does not appear within a pulse width of the transition detecting signal only when the received signals exist, thereupon outputting a data collision signal.

The step of forming the data transition detecting signal is carried out in such a manner that the received data signals are delayed for a certain period of time to form delayed data signals, and the delayed data signals and undelayed data signals are logic-processed, whereby the data transition detecting signal existing for a certain period of time from the data transition is generated through a logic circuit.

The step of outputting the data collision signal is carried out in such a manner that, if a pulse in data transition detecting signal Z does not exist at a rising edge of the delayed clock signal, by using a D flip-flop, output terminal Q is shifted to a low state to recognize an occurrence of data collision, and for a packet transmission network, the outputting the data collision signal is canceled, if within a certain time period carrier sense signal CRC makes the D type flip flop inactive.

BRIEF DESCRIPTION OF THE DRAWINGS

The above objects and other advantages of the present invention will become more apparent by describing in detail the preferred embodiment of the present invention with reference to the attached drawings in which:

FIGS. 2A to 2D illustrate wave patterns for respective portions of FIG. 1;

FIGS. 3A to 3C illustrate receiving timing charts for the rising edges of packets; and FIGS. 4A to 4C illustrate receiving timing charts for the trailing edges of the packets.

DESCRIPTION OF THE PREFERRED EMBODIMENTS

Figure 1:
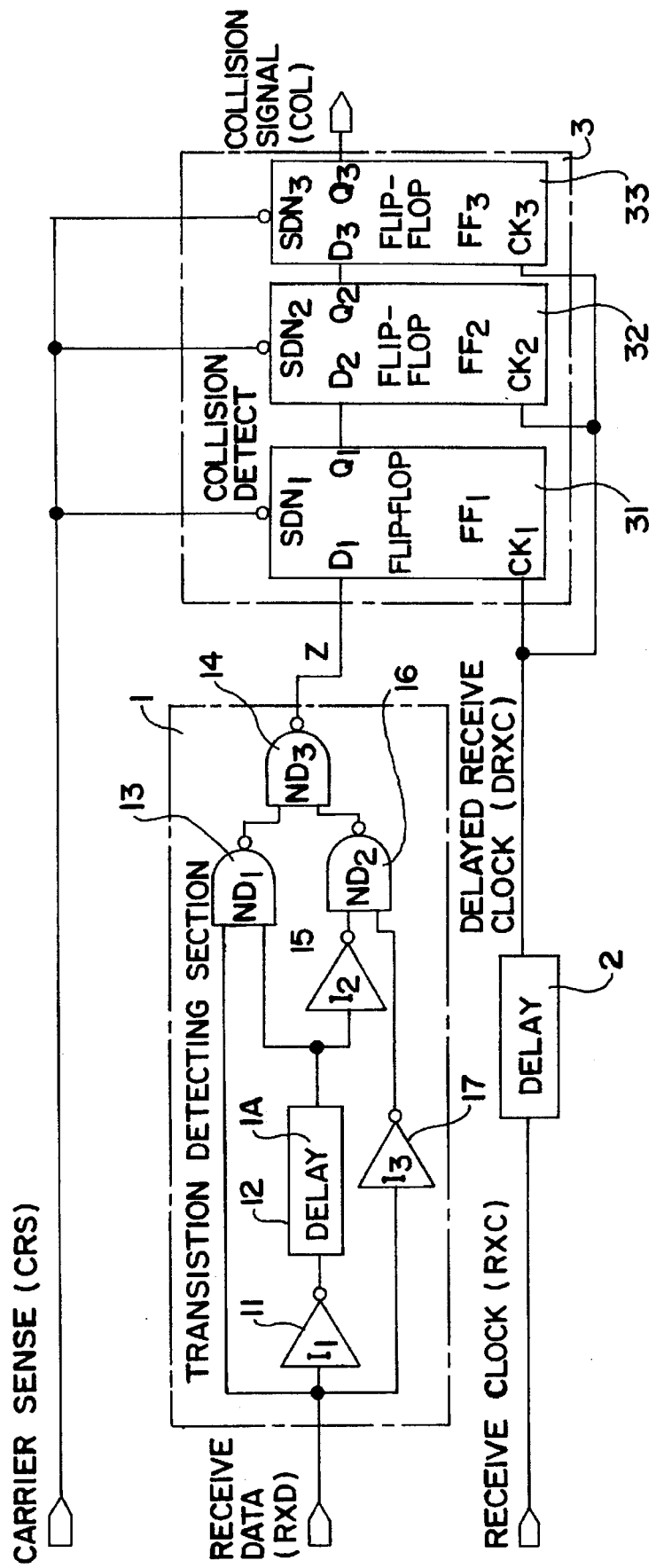
FIG. 1 illustrates the circuit for detecting data collisions in a short distance communication system according to the present invention.

As illustrated in FIG. 1, the circuit for detecting data collisions in a communication network according to the present invention includes data transition detecting section 1, clock delaying section 2 and collision detecting section 3.

Data transition detecting section 1 receives data signal RXD encoded based on the Manchester coding method, and detects a transition at the center of a bit cell of the encoded data signal, to generate transition detecting signal Z having a proper pulse width.

Data transition detecting section 1 includes delaying means 12 for delaying the received data for a certain period of time, and a logic circuit for logic-processing the delayed signals and undelayed signals. Delaying means 12 may be composed of either an R-C circuit or a plurality of serially connected inverters, buffers, etc.

The logic circuit includes: first NAND gate ($ND_1$) 13 having two input terminals, a first input terminal of which receives data signal RXD, and a second input terminal of which receives the output of delaying means 12; first inverter ($I_1$) 11 for receiving data signal RXD to supply an inverted output to delaying means 12; second inverter ($I_2$) 15 for receiving an output from delaying means (1A) 12 to output an inverted output; third inverter 17 for receiving data signal RXD to output an inverted output; second NAND gate ($ND_2$) 16 for receiving outputs from the second and third inverters into its two input terminals; and third NAND gate ($ND_3$) 14 for receiving outputs from first and second NAND gates $ND_1$ and $ND_2$ into its two input terminals to output transition detecting signal Z. In other embodiments, inverters $I_1$ and $I_3$ may constitute a single inverter.

Clock delaying section (delayer) 2 delays for a certain period of time received clock signal RXC having a certain cycle in synchronization with received data signal RXD, to output delayed clock signal DRXC. Like delaying means 12, clock delayer 2 is composed of an RC analog circuit or a plurality of serially connected inverters, buffers, etc.

Data collision detecting section 3 is turned to an active mode in accordance with data receiving status signal CRS illustrating the receiving status of the received data signal, to shift the status of output signals in accordance with transition detecting signal Z upon clocking of delayed clock signal DRXC.

Collision detecting section 3 may be composed of a D flip-flop which receives transition detecting signal Z from data transition detecting section 1 into its data input terminal D, and receives delayed clock signal DRXC from clock delayer 2 into its clock input terminal CK, and outputs an output having a status the same as that of the data input at a rising edge of the clock signal through an output terminal Q.

Further, collision detecting section 3 may comprise three (or some other number) D flip-flops connected in series, with the output terminal Q of the preceding stage connected to the input terminal D of the following stage, while the output terminal Q of the final stage outputs data collision signal COL. In this way, data collisions can be detected, such as in a packet network.

The circuit of the present invention constituted as above will be described as to its operations referring to FIGS. 2 to 4.

First, a checking is made as to whether received data signal RXD and received clock signal RXC exist. If they exist, then carrier sense signals CRS having a high signal state are supplied externally.

When receiving data signal RXD encoded based on the Manchester coding method as illustrated in FIG. 2A are input, it is supplied to data transition detecting section 1 to be input into one of the input terminals of first NAND gate $ND_1$. The signal is inverted and delayed while passing through first inverter $I_1$ and delaying means 12 (1A) so as to be supplied to the other input terminal of first NAND gate $ND_1$. The signal passes through the output terminal of delaying means 12 and second inverter $I_2$ to be supplied to one of the input terminals of second NAND gate $ND_2$. Received data signal RXD passes through third inverter $I_3$ to be supplied to the other input terminal of second NAND gate $ND_2$. The output signals of first and second NAND gates $ND_1$ and $ND_2$, are NAND-combined during the passage through third NAND gate $ND_3$, so as to output pulse signal Z having a certain pulse width as illustrated in FIG. 2B. Pulse signal Z is maintained at a high level for an interval as long as the delay interval of delaying means 12, when the received data signal is transmitted, i.e., shifted from a high level to a low level or from a low level to a high level.

Meanwhile, received clock signal RXC which has a certain cycle and which is synchronized with received data signal RXD is delayed by delayer 2 for a certain time period to be output as illustrated in FIG. 2C and to be supplied as clock signals $CK_1$–$CK_3$ for data collision detecting section 3. The time period delayed by delayer 2 is about ½ that of delaying means 12 in the preferred embodiment. Thus, delayed clock signal DRXC is made to rise at a middle time of the high pulse duration of transition detecting signal Z.

Therefore, first D flip-flop $FF_1$ of data collision detecting section 3 receives transition detecting signal Z from data transition detecting section 1. Thus, the output can vary in synchronization with delayed received clock signal DRXC from delayer 2.

If received data signal RXD exists, carrier sensing signal CRS is generated, and supplied to an SDN terminal of the D flip-flops for placing the flip-flops in an active mode or inactive mode. If the carrier, i.e., received data signal, exists, the signal CRS becomes high, and if there is none, then becomes low. Therefore, if signal CRS is low, the output of the D flip-flop becomes high regardless of the input D. If signal CRS is high, output Q can be varied in accordance with the rising edge timing of the clock pulse and in accordance with input D.

At the moment when delayed clock signal DRXC becomes high, the signal state of input D of D flip-flop $FF_1$ appears at the output signal $Q_1$ so as to be input into second D flip-flop $FF_2$. At the next moment when delayed clock signal DRXC becomes high, the output signal $Q_1$ which is the input D of second D flip-flop $FF_2$ appears at the output signal $Q_2$ of second D flip-flop $FF_2$ so as to be supplied to an input terminal of third D flip-flop $FF_3$. At the rising edge of the delayed clock signal DRXC, an output $Q_3$ is output as data collision detecting signal COL.

For example, as in cycles $T_1$ and $T_2$ of FIG. 2, if transition detecting signal Z which is supplied as input data for D flip-flop $FF_1$ maintains a high state for a "delay I" at the rising edge of the clock signal, then the clock signal which is delayed as much as a "delay II" rises to make the output Q of the flip-flop high. This is a case in which a data collision has not occurred, and therefore, the data collision detecting signal COL is output with a high level.

However, like in a cycle $T_5$ of FIG. 2, if transition detecting signal Z which is supplied to D flip-flop $FF_1$ is low at the rising edge of delayed clock signal DRXC (this being a state in which a data collision has occurred.), the low signal state of input D of first D flip-flop $FF_1$ appears in output signal $Q_1$ at the moment when a first pulse of the delayed clock signal DRXC become high, and thus may be supplied to second D flip-flop $FF_2$. The output signal $Q_2$ of the second D flip-flop $FF_2$ is shifted to a low state in the second pulse of delayed clock signal DRXC (T7), and output signal $Q_3$ of third D flip-flop $FF_3$ is shifted to a low state at the rising edge (T9) of third delayed clock signal DRXC. Thus the data collision detecting signal is made to be low so as to inform of the occurrence of a data collision. That is, at the moment when pulses of delayed clock signal DRXC are generated three times, i.e., at a cycle $T_9$, the data collision detecting signal COL is output with a low level. At the next cycle $T_{11}$ signal COL becomes high again.

FIG. 3 is a timing chart illustrating the method of detecting data collisions in a packet transmission network. FIG. 3A illustrates preamble signals of the packet transmission starting portion, and also illustrates a wave pattern of encoded received data signal RXD which sends a certain pulse repeatedly. FIG. 3B illustrates a wave pattern of the carrier sense signals which are shifted from low to high. FIG. 3C illustrates a wave pattern of the received clock signal DRXC which occurs with a certain time delay TDAT. Therefore, the first to third flip flops do not generate any errors, and as long as data are not collided, the signal COL is never shifted to a low state.

FIG. 4 is a timing chart illustrating wave patterns of the signals to illustrate that the operation does not generate errors even at the trailing end of data transmission in a packet transmission network. FIG. 4A illustrates a wave pattern of received data signal RXD, i.e., the trailing portion of the packet transmission, which are encoded based on the Manchester coding rule, and in which the last pulse descends slowly from high to low. FIG. 4B illustrates a wave pattern of the carrier sensing signal which is shifted from high to low because of the disappearance of the received data signal. FIG. 4C illustrates a wave pattern of the received clock signals which are continued for a certain period of time and disappear.

In this case also, carrier signal CRS has become low, and therefore, signal Z is maintained high until the first to third flip-flops are inactivated. If there is no received data, signal CRS is shifted to a low state, so that the flip-flops would be set to a high state. Consequently, an erroneous signal is not generated as if a data collision has occurred, in spite of the fact that there is none.

According to the present invention as described above, a edge trigger detecting circuit is used., and, therefore, a relatively short delay time is required, so that an analogue circuit can be replaced with a digital circuit. Further, the existing signals such as CRS and RXD, which are already made in another part of the receiving circuitry and the like, can be used as they are, so that the integrity and reliability can be improved.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A circuit for detecting data collisions in a communication network, comprising:

a data transition detector receiving a Manchester encoded data signal, the data transition detector detecting a transition at the center of a bit cell of the Manchester encoded data signal and outputting a transition detecting signal of a certain pulse width and a high or low state;

a delaying means for delaying a received clock signal having a cycle synchronized with the Manchester encoded data signal and outputting a delayed clock signal; and a data collision detector placed in an active mode in response to a data receiving status signal and shifting an output signal in accordance with the transition detecting signal upon clocking of the delayed clock signal;

wherein the data collision detector comprises one or more shifting means for receiving the transition detecting signal from the data transition detector at a data input of the data collision detector and receiving the delayed clock signal from the delaying means at a clock input of the data collision detector, and outputting an output signal having a high or low state determined by the high or low state of the data input to the data input at a rising edge of the delayed clock signal.

2. The circuit of claim 1, wherein the data transition detector comprises: a delaying means for delaying the Manchester encoded data signal for a certain period of time; and a logic circuit for logic-processing the Manchester encoded data signal and the delayed data signal.

3. The circuit of claim 2, wherein the logic circuit comprises:

a first NAND gate having two input terminals, a first input terminal of which receives the Manchester encoded data signal, and a second input terminal of which receives the output of the delaying means;

a first inverter for inverting the Manchester encoded data signal and supplying the inverted data signal to the delaying means;

a second inverter for inverting the output of the delaying means to generate an inverted output;

a third inverter for inverting the Manchester encoded data signal to generate an inverted output;

a second NAND gate receiving as inputs the outputs from the second and third inverters; and a third NAND gate for receiving outputs from the first and second NAND gates as inputs and outputting the transition detecting signal.

4. The circuit of claim 1, wherein the data collision detector comprises one or more flip-flops receiving the transition detecting signal from the data transition detector into a data input terminal, and receiving the delayed clock signal from the delayer into a clock input terminal, and outputting an output having the same status as the data input to the data input terminal at a rising edge of the delayed clock signal, and outputting a data collision signal through an output terminal of one of the flip-flops.

5. The circuit of claim 1, wherein the data collision detector comprises three D flip-flops connected in series and receiving the transition detecting signals from the data transition detector into a data input terminal, and receiving the delayed clock signal into a clock input terminal and outputting an output having the same status as the data input at a rising edge of the clock signal, and outputting a data collision signal through an output terminal;

wherein the output terminal of a preceding stage of the D flip-flops is connected to an input terminal of a following stage of the D flip-flops, and the output terminal of a final stage outputs the data collision signal.

6. The circuit of claim 2, wherein the logic circuit comprises:

a first NAND gate having two input terminals, a first input terminal of which receives the Manchester encoded data signal, and a second input terminal of which receives the output of the delaying means;

a first inverter for inverting the Manchester encoded data signal and supplying the inverted data signal to the delaying means;

a second inverter for inverting the output of the delaying means to generate an inverted output;

a second NAND gate receiving as inputs the outputs from the first and second inverters; and a third NAND gate for receiving outputs from the first and second NAND gates as inputs and outputting the transition detecting signal.

7. A method for detecting data collisions of Manchester encoded data, comprising the steps of:

receiving a Manchester encoded data signal and detecting a transition at a center of a bit cell of the encoded data signal, and forming a transition detecting signal having a pulse existing for a certain period of time from the occurrence of a transition of the encoded data signal;

delaying a clock signal, the clock signal having a cycle synchronized with the encoded data signal, and forming a delayed clock signal;

recognizing a data collision upon a rising edge of the delayed clock signal, and outputting a data collision signal if the transition detecting signal is not at a high level;

wherein the step of outputting the data collision signal is carried out in such a manner that, if a high pulse of the data transition detecting signal does not exist at a data input to a flip-flop at a rising edge of the delayed clock signal, then an output of the flip-flop is shifted to a low state to recognize occurrence of a data collision.

8. The method of claim 7, where in the data collision signal is not output if at the time of outputting the data collision signal the encoded data signal is not being received.

9. The method of claim 7, wherein the step of forming the data transition detecting signal comprises the steps of delaying the encoded data signal for a certain time period to form a delayed data signal, and logically processing the delayed data signal and undelayed data signal, wherein the data transition detecting signal is generated by the logical processing upon an occurrence of a data transition of the encoded data signal.

10. The circuit of claim 1, further comprising a packet transmission network coupled to the data transition detector, wherein the data signal comprises packet transmission data.

11. The method of claim 7, wherein the step of outputting the data collision signal is carried out in such a manner that, if the data transition detecting signal does not exist at a data input of a first flip-flop at a rising edge of the delayed clock signal, then an output of the first flip-flop is shifted to a low state, an output of a second flip-flop is shifted to a low state at a second rising edge of the delayed clock, and an output of a third flip-flop is shifted to a low state at a third rising edge of the delayed clock, wherein the output of the third flip-flop is delayed three cycles of the delayed clock signal to recognize occurrence of a data collision.

12. The method of claim 11, wherein if the data signal does not exist before the rising edge of the third clock pulse, then an occurrence of a data collision is not recognized.

13. The method of claim 9, wherein the clock signal delaying time is about ½ of the data signal delaying time.

14. A circuit for detecting data collisions in a communication network, comprising:

a data transition detector receiving a data signal, the data transition detector detecting a transition at a center portion of a bit cell of the data signal and outputting a transition detecting signal of a certain pulse width;

a delayer delaying a received clock signal having a cycle synchronized with the data signal and outputting delayed clock signal; and a data collision detector placed in an active mode in response to a data receiving status signal and shifting an output signal in accordance with the transition detecting signal upon clocking of the delayed clock signal;

wherein the data transition detector comprises: a delaying means for delaying the data signal for a certain period of time; and a logic circuit for logic-processing the data signal and the delayed data signal;

wherein the logic circuit comprises:

a first NAND gate having two input terminal of which receives the data signal, and a second input terminal of which receives the output of the delaying means;

a first inverter for inverting the data signal and supplying the inverted data signal to the delaying means;

a second inverter for inverting the output of the delaying means to generate an inverted output;

a third inverter for inverting the data signal to generate an inverted output;

a second NAND gate receiving as inputs the outputs from the second and third inverters; and a third NAND gate for receiving outputs from the first and second NAND gates as inputs and outputting the transition detecting signal.

15. The circuit of claim 14, wherein the data signal comprises a Manchester encoded data signal.

16. The circuit of claim 14, further comprising a packet transmission network coupled to the data transition detector, wherein the data signal comprises packet transmission data.

17. A circuit for detecting data collisions in a communication network, comprising:

a data transition detector receiving a data signal, the data transition detector detecting a transition at a center portion of a bit cell of the data signal and outputting a transition detecting signal of a certain pulse width;

a delayer delaying a received clock signal having a cycle synchronized with the data signal and outputting a delayed clock signal; and a data collision detector placed in an active mode in response to a data receiving status signal and shifting an output signal in accordance with the transition detecting signal upon clocking of the delayed clock signal;

wherein the data collision detector comprises one or more flip-flops receiving the transition detecting signal from the data transition detector into a data input terminal, and receiving the delayed clock signal from the delayer into a clock input terminal, and outputting an output having the same status as the data input to the data input terminal at a rising edge of the delayed clock signal, and outputting a data collision signal through an output terminal of one of the flip-flops.

18. The circuit of claim 17, wherein the data signal comprises a Manchester encoded data signal.

19. The circuit of claim 17, further comprising a packet transmission network coupled to the data transition detector, wherein the data signal comprises packet transmission data.

20. A circuit for detecting data collisions in a communication network, comprising:
   a data transition detector receiving a data signal, the data transition detector detecting a transition at a center portion of a bit cell of the data signal and outputting a transition detecting signal of a certain pulse width;
   a delayer delaying a received clock signal having a cycle synchronized with the data signal and outputting a delayed clock signal; and
   a data collision detector placed in an active mode in response to a data receiving status signal and shifting an output signal in accordance with the transition detecting signal upon clocking of the delayed clock signal;
   wherein the data collision detector comprises a plurality of flip-flops connected in series and receiving the transition detecting signals from the data transition detector into a data input terminal, and receiving the delayed clock signal into a clock input terminal and outputting an output having the same status as the data input at a rising edge of the clock signal, and outputting a data collision signal through an output terminal;
   wherein the output terminal of a preceding stage of the flip-flops is connected to an input terminal of a following stage of the flip-flops, and the output terminal of a final stage outputs the data collision signal.

21. The circuit of claim 20, wherein the data signal comprises a Manchester encoded data signal.

22. The circuit of claim 20, further comprising a packet transmission network coupled to the data transition detector, wherein the data signal comprises packet transmission data.

23. A circuit for detecting data collisions in a communication network, comprising:
   a data transition detector receiving a data signal, the data transition detector detecting a transition at a center portion of a bit cell of the data signal and outputting a transition detecting signal of a certain pulse width;
   a delayer delaying a received clock signal having a cycle synchronized with the data signal and outputting a delayed clock signal; and
   a data collision detector .placed in an active mode in response to a data receiving status signal and shifting an output signal in accordance with the transition detecting signal upon clocking of the delayed clock signal;
   wherein the data transition detector comprises: a delaying means for delaying the data signal for a certain period of time; and a logic circuit for logic-processing the data signal and the delayed data signal;
   wherein the logic circuit comprises:
   a first NAND gate having two input terminals, a first input terminal of which receives the data signal, and a second input terminal of which receives the output of the delaying means;
   a first inverter for inverting the data signal and supplying the inverted data signal to the delaying means;
   a second inverter for inverting the output of the delaying means to generate an inverted output;
   a second NAND gate receiving as inputs the outputs from the first and second inverters; and
   a third NAND gate for receiving outputs from the first and second NAND gates as inputs and outputting the transition detecting signal.

24. The circuit of claim 23, wherein the data signal comprises a Manchester encoded data signal.

25. The circuit of claim 23, further comprising a packet transmission network coupled to the data transition detector, wherein the data signal comprises packet transmission data.

26. A method for detecting data collisions of transmitted data, comprising the steps of:
   receiving a data signal and detecting a transition at a center of a bit cell of the data signal, and forming a transition detecting signal having a pulse existing for a certain period of time from the occurrence of a transition of the data signal;
   delaying a clock signal, the clock signal having a cycle synchronized with the data signal, and forming a delayed clock signal;
   recognizing a data collision upon a rising edge of the delayed clock signal, and outputting a data collision signal if the transition detecting signal is not at a high level;
   wherein the step of outputting the data collision signal is carried out in such a manner that, if the data transition detecting signal does not exist at a data input of a first flip-flop at a rising edge of the delayed clock signal, then an output of the first flip-flop is shifted to a low state, an output of a second flip-flop is shifted to a low state at a second rising edge of the delayed clock, and an output of a third flip-flop is shifted to a low state at a third rising edge of the delayed clock, wherein the output of the third flip-flop is delayed three cycles of the delayed clock signal to recognize occurrence of a dam collision.

27. The method of claim 26, wherein the data signal comprises Manchester encoded data.

28. The method of claim 26, wherein if the data signal does not exist before the rising edge of the third clock pulse, then an occurrence of a data collision is not recognized.

29. A method for detecting data collisions of transmitted data, comprising the steps of:
   receiving a data signal and detecting a transition at a center of a bit cell of the data signal, and forming a transition detecting signal having a pulse existing for a certain period of time from the occurrence of a transition of the data signal;
   delaying a clock signal, the dock signal having a cycle synchronized with the data signal, and forming a delayed chock signal;
   recognizing a data collision upon a rising edge of the delayed clock signal, and outputting a data collision signal if the transition detecting signal is not at a high level;
   wherein the step of forming the data transition detecting signal comprises the steps of delaying the data signal for a certain time period to form a delayed data signal, and logically processing the delayed data signal and undelayed data signal, wherein the data transition detecting signal is generated by the logical processing upon an occurrence of a data transition of the encoded data signal, and wherein the clock signal delaying time is about ½ of the data signal delaying time.

30. The method of claim 29, wherein the data signal comprises Manchester encoded data.

* * * * *